United States Patent [19]

D'Amico et al.

[11] Patent Number: 5,159,593
[45] Date of Patent: Oct. 27, 1992

[54] CHANNEL ACQUISTION AND HANDOFF METHOD AND APPARATUS FOR A TDMA COMMUNICATION SYSTEM

[75] Inventors: Thomas V. D'Amico, Boca Raton; Brian Johnson, Plantation, both of Fla.; Theodore Saltzberg, Chicago, Ill.

[73] Assignee: Motorola, Inc., Schaumburg, Ill.

[21] Appl. No.: 546,647

[22] Filed: Jul. 2, 1990

[51] Int. Cl.⁵ .............................................. H04J 3/16
[52] U.S. Cl. .................................. 370/95.3; 370/85.6
[58] Field of Search .................... 370/95.3, 58.2, 95.1, 370/85.3, 85.6; 455/34

[56] References Cited

U.S. PATENT DOCUMENTS

| | | | |
|---|---|---|---|
| 4,549,293 | 10/1985 | Christian et al. | 370/95.3 |
| 4,642,806 | 2/1987 | Hewitt et al. | 370/95.3 |
| 4,644,534 | 2/1987 | Sperlich | 370/95.3 |
| 4,726,014 | 2/1988 | Goldman et al. | 370/58.2 |
| 4,887,265 | 12/1989 | Felix | 455/34 |
| 4,949,395 | 8/1990 | Rydbeck | 370/95.3 |

Primary Examiner—Douglas W. Olms
Assistant Examiner—T. Samuel
Attorney, Agent, or Firm—Michael J. Buchenhorner; M. Mansour Ghomeshi

[57] ABSTRACT

A TDMA communication system (100) comprises a two-way subscriber unit (112') and at least two base stations (104b and 104c). The subscriber unit monitors the strengths of signals (114') received from the base stations. As the subscriber unit roams within the area serviced by the communication system, the received signal strength will vary as the subscriber unit moves nearer to or farther from the base station that is transmitting the call. When the subscriber unit moves out of the range of the base station, the subscriber unit determines, based on certain predetermined criteria, with which base station to communicate.

20 Claims, 5 Drawing Sheets

CHANNEL ACQUISTION AND HANDOFF METHOD AND APPARATUS FOR A TDMA COMMUNICATION SYSTEM

TECHNICAL FIELD

This invention relates generally to radio frequency (RF) time division multiple access (TDMA) communication systems, and more specifically to TDMA communications systems having a plurality of transceivers (base stations) distributed throughout a geographic area. and is particularly directed toward channel acquisition and handoff in such systems, and protocols for handing off a call from one base station to another base station as participants of the call roam within the geographic area.

BACKGROUND

In a TDMA communication system a plurality of subscriber units (e.g., portable two-way radios) share a number of time slots that are assigned by a system controller based on availability. The subscriber units communicate with each other and with other communication units via a plurality of base stations. In such communication systems, some mechanism must be provided to allow subscribers operating within the system to roam or travel about the area served by the communication system. For example, conventional cellular telephone systems divide a geographic area into several "cells", each of which contains one or more multi-channel base stations controlled by a cell site controller. Each cell site controller determines the received signal strength of each call in progress, and forwards this information to a network controller. The network controller uses the signal strength information to determine when one cell should "hand-off" a call to another cell. In this way, communication is maintained as subscribers roam from cell to cell. In TDMA systems, different processes are required for channel (i.e., time slot) acquisition by subscriber units and handoff.

SUMMARY OF THE INVENTION

Briefly, according to the invention, each subscriber operating within a TDMA communication system monitors the strength of a received signal (e.g., a call). When a subscriber makes a call it transmits a request for a channel assignment. The choice of channel is determined by the subscriber and a base station based on a set of criteria that are determined by both the subscriber and the base station. As the subscriber roams within the area serviced by the communication system, the received signal strength will vary as the subscriber moves nearer to or farther from the base station that is transmitting the call. When the subscriber unit moves out of the range of the base station, that subscriber unit determines, again based on predetermined criteria determined by both the subscriber unit and the base station, with which base station to communicate.

DETAILED DESCRIPTION OF THE PREFERRED EMBODIMENT

Figure 1:
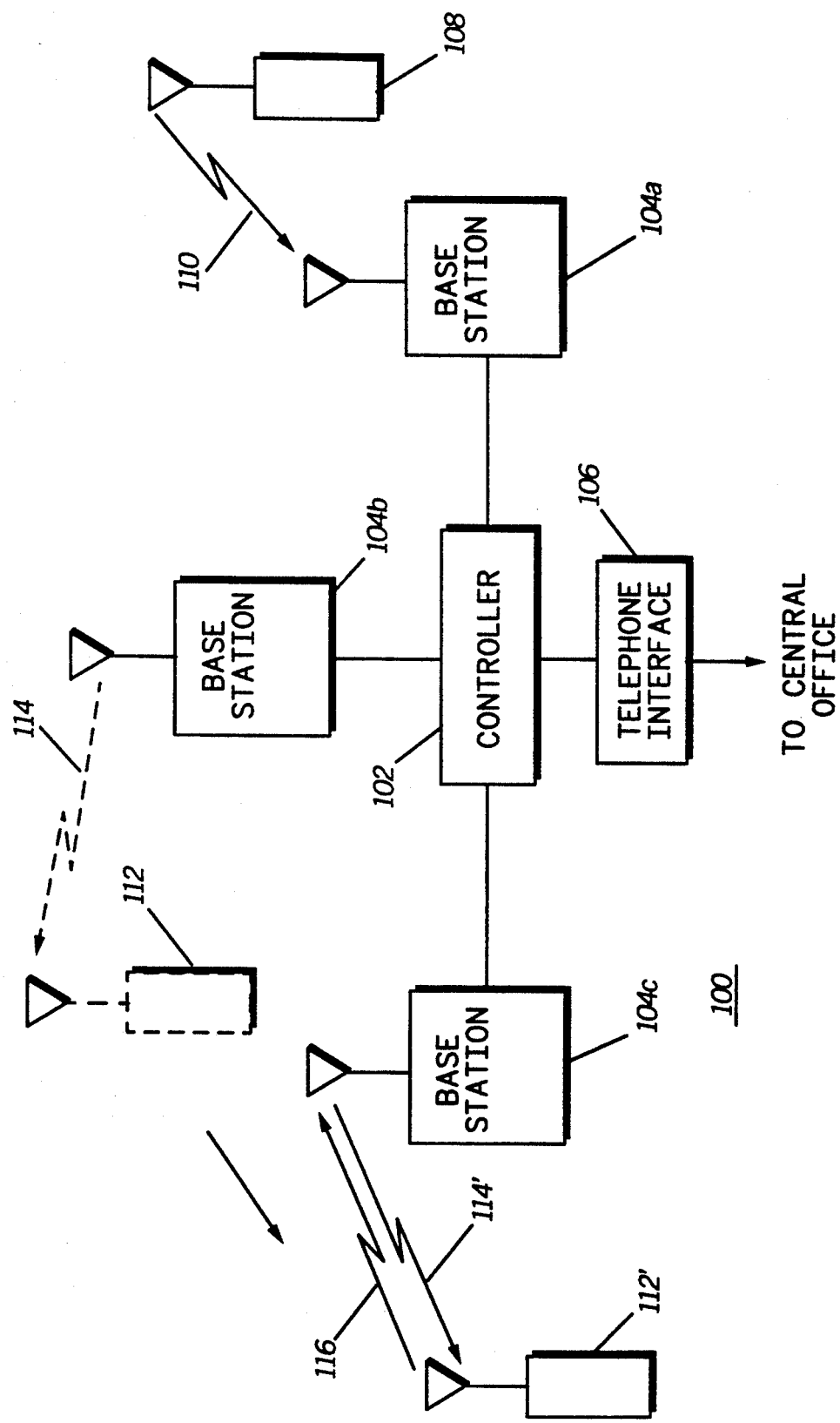
FIG. 1 is an illustration of a communication system in accordance with the present invention.

Referring to FIG. 1, there is shown a block diagram of a communication system 100 in accordance with the present invention. The system 100 comprises a controller 102, a plurality of subscriber units (represented by subscriber units 108, 112, and 112'), and a plurality of base stations 104a–c, which operate to repeat calls or messages between at least two of the subscriber units. Each base station defines a "smart cell". A "smart cell" is one that performs the following functions: (a) detecting and storing all signal strengths of subscribers prior to handoff to other cell bases (i.e. define minimum and maximum signal level boundaries for handoff); (b) monitoring other outbound time slots to determine channel utilization to nearby cells; and (c) based on command from the controller or programming, the base (and consequently the subscriber) can execute a selected channel (time slot) assignment process. Selected channnel assignment processes may have different functions, which can range from maximizing channel utilization to other objectives including minimizing disrupted calls due to lack of acceptable handoff slots (i.e., cell to cell handoff or time slot handoff within the same cell). "Optionally, the system 100 may include a telephone interface 106, which couples the controller 102 to a central office of any conventional telephone network. In this way, subscribers operating within the communication system 100 may communicate with parties outside the communication system 100 via telephone. Of course, the telephone interface 106 may be implemented as a component of the controller 102.

According to an embodiment of the invention, the subscriber units operate within the communication system 100 as duplex units. The system includes a plurality of time slots that are shared among the subscriber units. One of the time slots contains an imbedded control channel (i.e., a number of bits in each time slot comprise a control channel). A base station always transmits in at least one time slot. If the base is not communicating with a subscriber unit, a dummy time slot transmission is sent. Base transmissions include a base ID.

According to the invention, the subscriber unit (e.g., 108) normally determines with which cell base station to communicate (e.g., base 104a). This is done by measuring the signal strength of outbound (i.e., base-to-subscriber) time slots, and comparing their relative levels, or using other criteria (e.g., the number of channels in use by a base station or trends in signal strength). When idle, the subscriber units monitor the control channel(s) of the strongest base station for outbound pages.

When the subscriber unit 108 initiates a call, or receives an outbound page, it transmits a request for a channel assignment and a portion (which may be none or all) of a time slot preference list (generated by the subscriber unit 108 based on a set of predetermined criteria such as carrier-to-interference ratios) in the time slot with the highest preference. The subscriber unit's preference list assigns the highest priority or preference to the time slots having the lowest signal strength. The base station 104a also maintains its own time slot preference list (assigning the highest preference to the signals having the lowest signal strength). If the base station 104a acknowledges the channel request, the subscriber unit 108 and base 104a jointly choose the highest combined preference level time slot based on the intersection of both preference lists and initiate communication in the chosen time slot. If the channel request is not acknowledged, the subscriber unit retries a predetermined number of times (which may be zero times), then sends the request and preference list in the time slot with the next highest preference. This process is repeated until a channel assignment is achieved or a predetermined number of tries is exceeded.

The present invention also operates to hand-off (or route) a call from subscriber to subscriber (or from a subscriber to a third party communicating by telephone) as the receiving subscriber roams within the communication system 100. Accordingly, FIG. 1 illustrates a subscriber 108 communicating with a subscriber 112 in the communication system 100. As is shown, subscriber 108 (the transmitting subscriber) transmits a message 110 to a base station 104a. The message received by the base station 104a is routed by the controller 102 to another base station 104b (i.e., the base station nearest the subscriber 112), which transmits a message 114 to the subscriber 112. This provides the subscriber 112 with a sufficient received signal level to facilitate the reception of a quality signal. However, the present invention contemplates that the subscriber 112 may move out of range of the base station 104b during reception of the message, which may cause a degradation in received signal quality or a complete loss of communication.

According to the invention, as the receiver 112 relocates to a different area (along the direction indicated by the arrow A) the receiver 112' becomes out of range of the base station 104b. Accordingly, the subscriber 112' normally determines which cell base station to communicate with by measuring the strength of outbound (i.e., base to portable) time slots and comparing relative levels (or, for example, by using other predetermined criteria such as the number of channels in use by a base station, the availability of acceptable time slots, the available bit rate, or trends in signal strength) and forwards that information to the controller 102. Then the controller 102 appropriately routes the message to both base stations 104b and 104c, to continue transmission of the message 114' to the subscriber 112'. Communication is never interrupted because the subscriber 112' communicates with both base stations for a short period of time. This process may be repeated, as necessary, as subscribers roam within the communication system 100. When it is idle, the subscriber 112' monitors the control channel(s) of the strongest base station (104c in this example) for outbound pages.

The subscriber 112' measures the strengths of all inbound (portable to base) and outbound time slots and maintains a time slot preference list. This list gives the highest preference to the time slots having the lowest signal strength (lowest level of expected interference). Potential carrier to interference ratios (CIRs) are also calculated and time slots with insufficient CIR levels do not appear on the list (e.g., if CIR is 20 dB minimum, outbound time slots with signal strengths more than 20 dB below the signal strength of the strongest base are excluded from the list). Base stations maintain lists similar to those maintained by the subscribers.

If insufficient CIR is encountered by subscriber 112' during a call (e.g. bit error rate exceeds a predetermined threshold by either the base station or the subscriber or other criteria indicates a time slot change), then either the subscriber 112' or the base station 104c, or both, may request a time slot, change following the previously described method. (Note that the request may be transmitted in the current time slot, a preferred new time slot or both). If no acceptable time slot is available, the base station 104c will inform the subscriber 112' so that the subscriber 112' may consider handoff to another cell base station with adequate signal level.

Handoffs to other cells are typically initiated by the subscriber. If during a call, the signal level from another cell base station (e.g. 104c) is sufficiently stronger than that from the current cell base station (e.g. 104b) for a predetermined length of time, or other criteria indicate handoff to another cell base station, the subscriber 112' communicates with the new cell base station 104c to determine a new time slot (while continuing the call with the current cell base station 104b). This is accomplished using the previously-described method. The new cell base station 104c then informs the controller 102 to route the call to it, while maintaining the connection to the current cell 104b. Once the call has been routed to the new cell 104a, the new cell base station 104c informs the subscriber 112 to switch to the new time slot (in the new cell). After receiving the call in the new time slot, the new base station 104c informs the controller 102, and the call is disconnected from the old base 104b.

If no time slot is available that meets the process's requirements, then the subscriber 112 may inform its user, via an audible, visual, or other sensory means, that handoff is not presently possible. Thus, the user then has the option of remaining in the current cell to continue the call.

Figure 2:
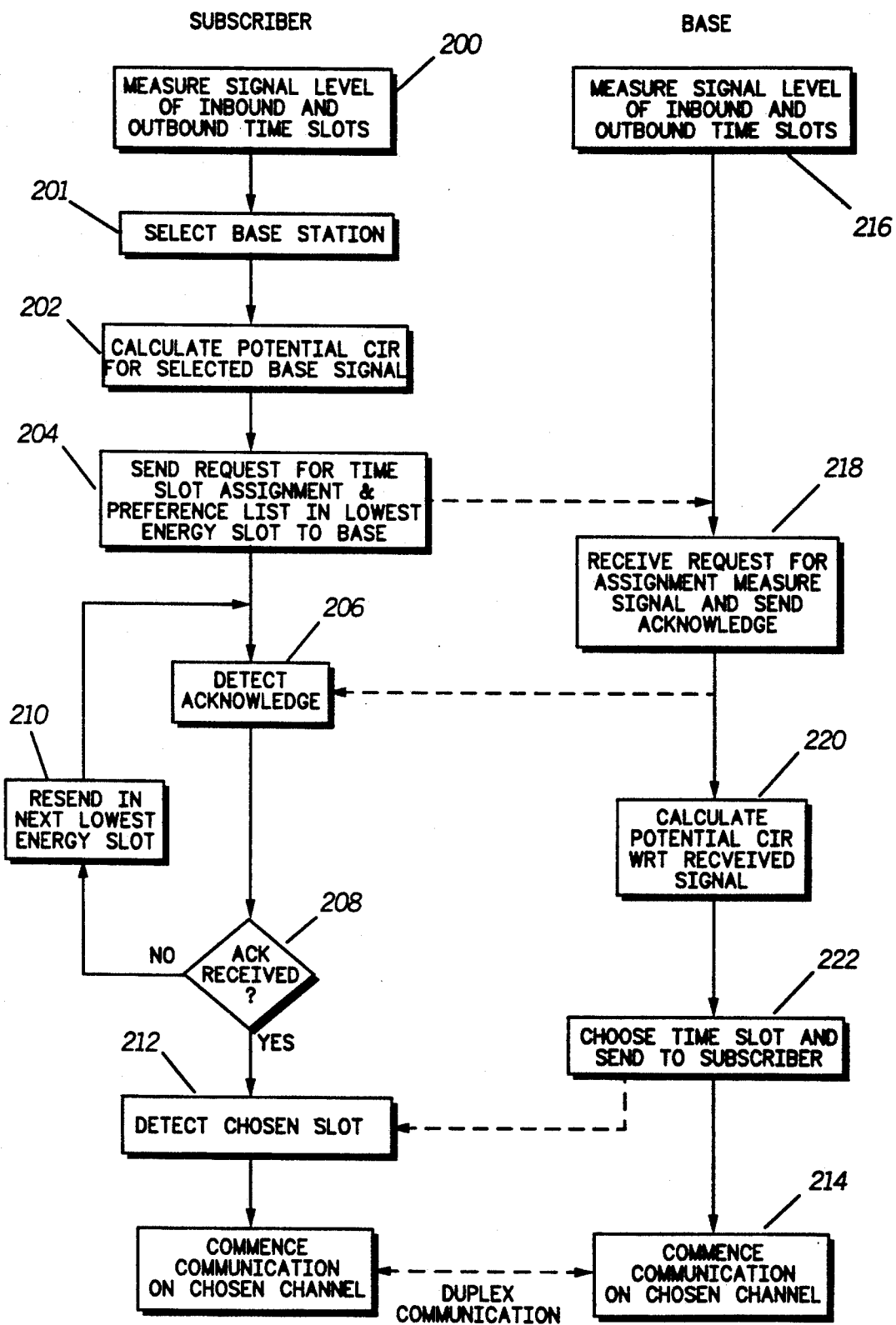
FIG. 2 is a flow diagram of the steps executed by the subscribers and bases of FIG. 1 in a time slot acquisition method in accordance with the invention.

Referring to FIG. 2, a simplified flow diagram is shown illustrating the steps executed by subscriber units and bases in a channel acquisition process in accordance with the invention. The process begins in steps 200 and 216, where a subscriber unit and a base, repectively, measure the signal level of inbound and outbound time slots. In step 201 the subscriber unit selects a base station. In step 202 the subscriber calculates the CIR with respect to the selected base station signal. The subscriber unit and the base each maintain time slot preference lists based on the information determined in steps 200, 202, and 216. The subscriber unit will not request assignment of a time slot with an associated CIR below a predetermined level.

In step 204 the subscriber unit sends the selected base a request for a time slot assignment and the preference list in the lowest energy slot. Next, in step 218, the base receives the request for time slot assignment from the subscriber, measures the level of the received signal, and sends out an acknowledgement signal. In step 206 the subscriber unit detects the acknowledgement signal (if present) from the base. If it was not received, the subscriber detects the chosen slot in step 212. If not, the request message is resent (step 210) in the next lowest energy slot, and steps 206 and 208 are repeated.

In step 220 the base calculates the CIR with respect to the received signal (using the signal level measured in step 218) and modifies its preference list accordingly. The base then chooses (222) a time slot based on the criteria in its preference list and in the preference list received from the subscriber, and sends a time slot assignment to the subscriber.

If the subscriber receives the acknowledgement signal, from the base (in step 206), the subscriber process to step 212. Once the subscriber detects (212) the chosen slot, it proceeds to step 214, wherein duplex communication commences on the chosen channel.

Figure 3:
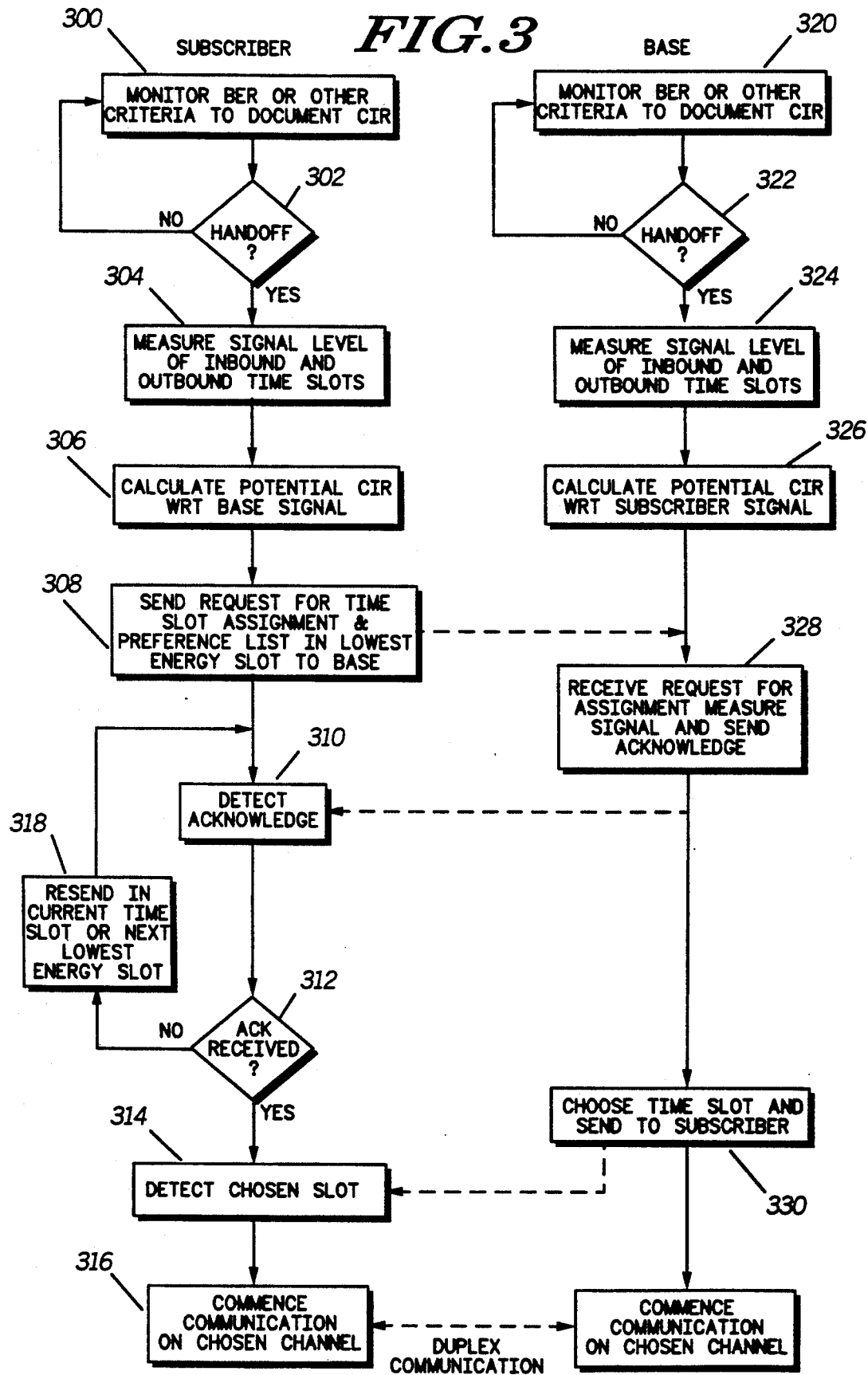
FIG. 3 is a flow diagram of a time slot handoff process in accordance with the invention.

Referring to FIG. 3, a simplified flow diagram is shown illustrating the steps executed by subscriber units and bases in a time slot handoff process in accordance with the invention. The process begins in steps 300 and 320, where a subscriber unit and the base, respectively, monitor the BER or other criteria to determine the CIR. In decision 302 the subscriber determines whether a handoff is required or not. If it is required, the subscriber measures (304) the signal level of inbound and outbound time slots, and calculates (306) the potential CIR with respect to the base signal, or the strongest signal. In step 308, the subscriber sends the base (in the current time slot) a request for a time slot assignment and its preference list. Meanwhile, the base determines (322) whether a handoff is required. If it is required, the base measures (324) the signal level of the inbound and outbound time lots and calculates (326) the CIR with respect to the received subscriber signal. Next, in step 328, the base receives a request for assignment from the subscriber and sends out an acknowledgement signal. The base then chooses (330) a time slot and sends it to the subscriber. In step 310, the subscriber detects the acknowledgement signal (if present) from the base.

In decision 312 the subscriber determines whether the acknowledgement was received. If it was not, the subscriber resends (318) the channel request in the current time slot, or in the next lowest energy slot, and the process repeats step 310. If it was received, the subscriber commences communication (316) on the chosen channel.

Figure 4:
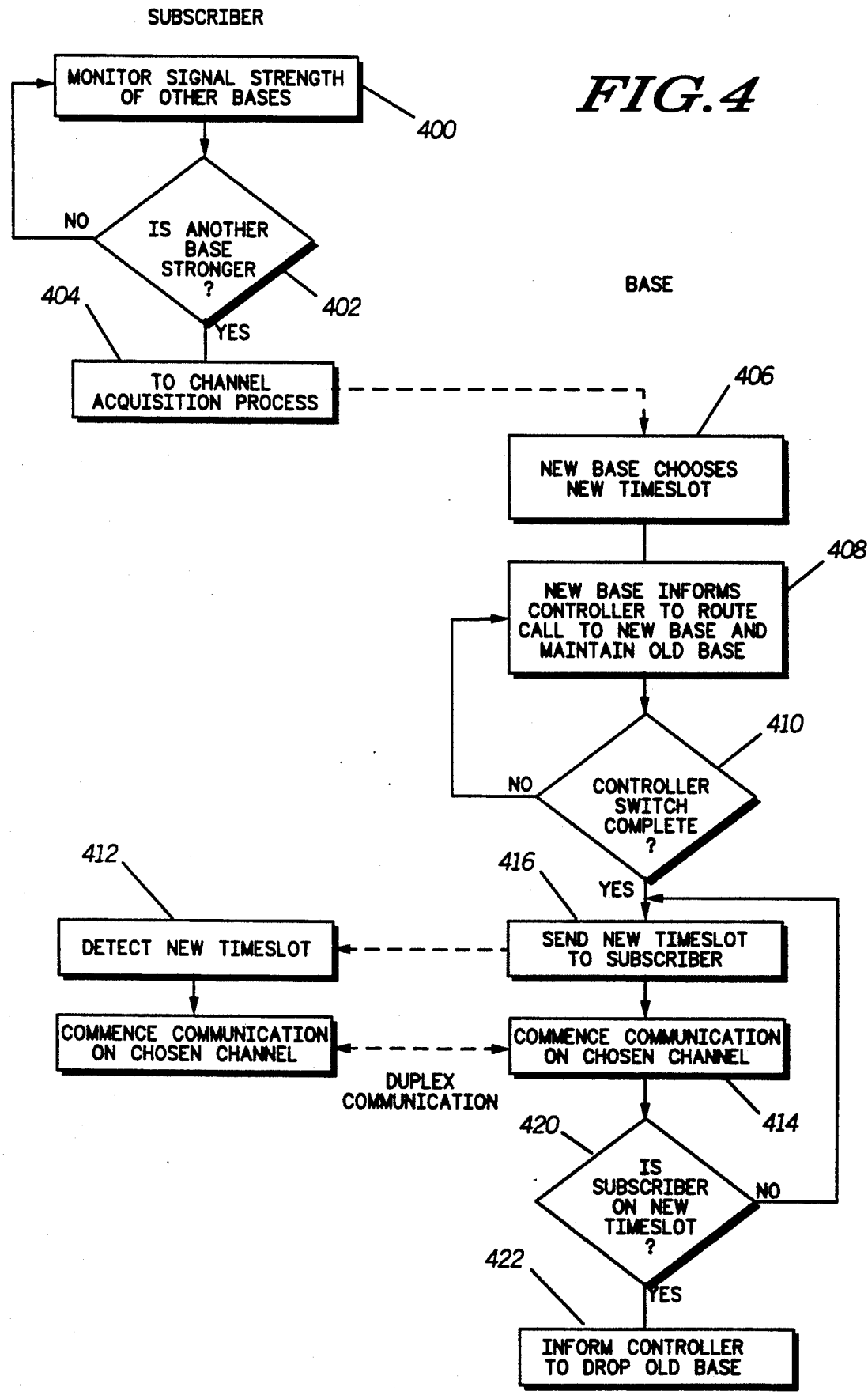
FIG. 4 is a flow diagram of a cell handoff process in accordance with the invention.

Referring to FIG. 4, a simplified cell handoff process in accordance with the invention is shown. Assuming that the subscriber 112' of FIG. 1 is communicating via the base 104b, in step 400 the subscriber 112' monitors the signal strength of the other bases in the communication system 100. Using the information resulting from step 400, the subscriber 112' determines (402) whether the signal strength of a signal received from another base is stronger. If there is no other base with a stronger received signal, the subscriber 112' repeats step 400. If there is another base (e.g., base 104c) with a stronger received signal, the subscriber 112' proceeds (404) to a channel acquisition process, resulting in selection of base 104c. The base 104c then chooses (406) a new time slot. Next, in step 408 base 104c informs the controller 102 to route the call to base 104c, and to maintain the old base connection (i.e., base 104b). In decision (410) the base 104c determines whether the switch (made by controller 102) from base 104b to base 104c is complete. If the switch is not complete, step 408 is repeated. If the switch is complete, the base 104c sends a new time slot to the subscriber 112'. When the subscriber 112' detects (412) the new time slot, communication between the subscriber 112' and the base 104c commences (414, 418) on the chosen channel. Following step 414, the base 104c determines (420) whether the subscriber 112' is on the new time slot. If it is not, the base 104c returns to step 416. If the decision 420 results in an affirmative determination, the base 104c informs the controller to drop the old base 104b.

Figure 5:
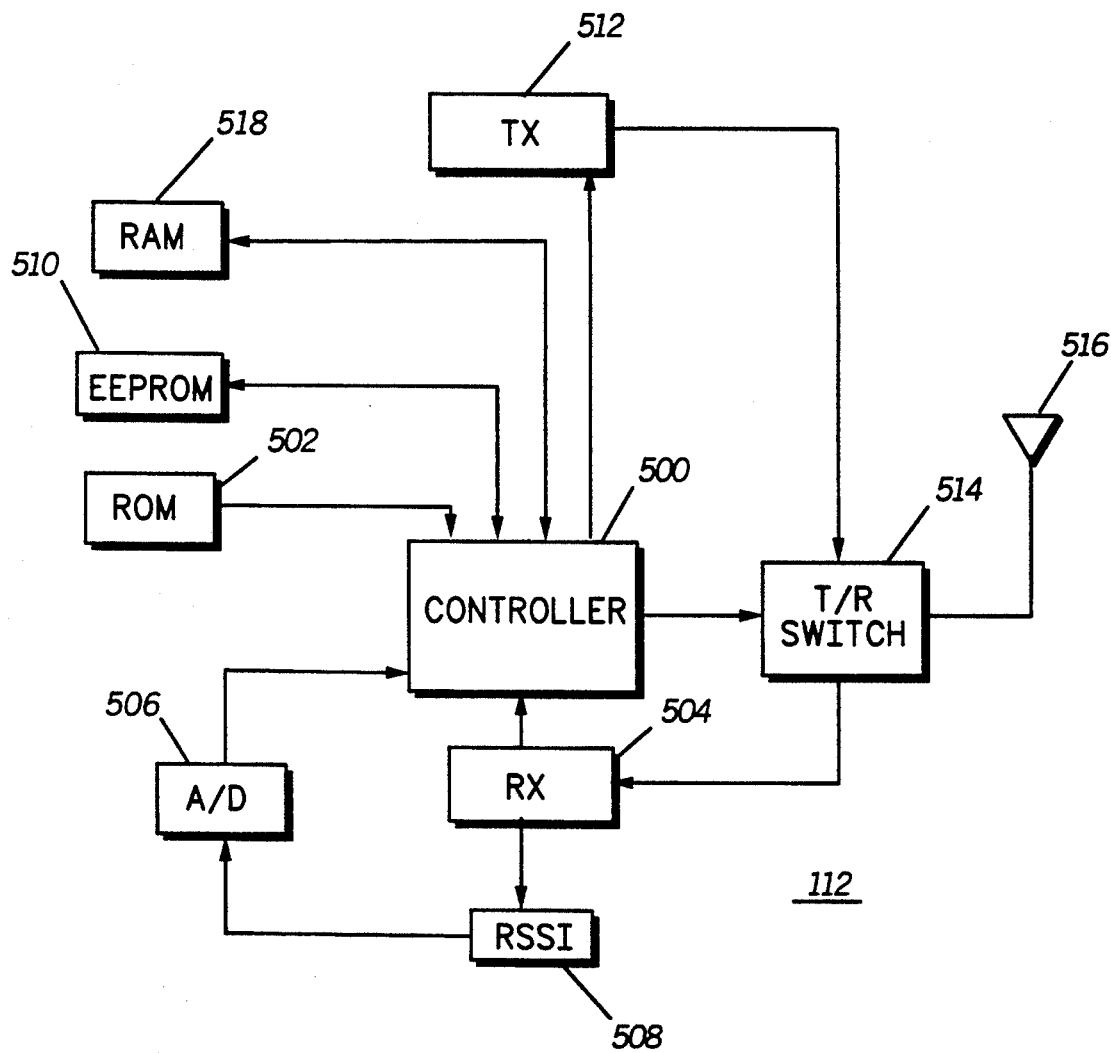
FIG. 5 is a block diagram of a subscriber unit.

In the preferred embodiment of the invention, the subscriber units 112 comprise microprocessor controlled two-way radios. Referring to FIG. 5, the block diagram of one such subscriber unit is shown. The subscriber unit 112 receives outbound signals through an antenna 516 which is couped to a T/R switch 514. In receive mode, the T/R switch 514 under the control of a controller 500 couples the antenna 516 to a receiver 504. The receiver 504 decodes the received signals, and applies those signals to the controller 500 for processing. The controller 500 provides operational control and timing for the subscriber unit 112 by executing well known instructions which are stored in its Read Only Memory (ROM) 502. Upon decoding of the received messages, the controller 500 takes predefined steps to effectuate proper operation of the subscriber unit 112. The controller 500 also receives a received signal strength indicator (RSSI) signal from a well known RSSI circuit 508. The RSSI signal level is proportional to the strength of the received signal. The voice/data messages, are transmitted by a transmitter 512. A CIR calculation is performed by the controller 500 based on information on each time slot from the RSSI circuit. The preference list based on the calculated CIRs is generated by the controller 500 and stored in a RAM 518. The RSSI level is converted to a digital signal by an analog to digital converter 506. The bits of data comprising personality of the communication unit 150 are stored in the EEPROM 235. The stored data may be programmed into the radio during manufacturing in the factory or in the field. In the preferred embodiment, stored data in the EEPROM 235 may be dynamically supplemented or modified by the user via a keypad/display, or a well known field programmer (not shown).

What is claimed is:

1. In a TDMA communication system having a communication medium with a plurality of time slots, at least one of which includes a control channel, at least one subscriber unit, and a plurality of base stations, a method for time slot acquisition comprising the steps of:

(a) transmitting, with each base station, a radio-frequency signal in at least one time slot;

with the subscriber unit:

(b) receiving at least some of the radio-frequency signals in at least one of the time slots;

(c) measuring signal strengths of outbound time slots received by the subscriber unit from the base stations;

(d) selecting which base station to communicate with based on a set of predetermined criteria;

(e) measuring the signal strengths of the inbound and outbound time slots to produce a first preference list, wherein the highest priority is assigned to the signal having the lowest strength;

(f) determining the potential carrier to interference ratios, with respect to the signal strength of the selected base station, of the time slots in the first preference list;

(g) transmitting, on the inbound time slot having the lowest signal strength, a request for a time slot assignment from the base station selected in step (d) and at least a portion of the first preference list;

with the selected base station:

(h) measuring the signal strengths of the inbound and outbound time slots to produce a second preference list wherein highest priority is assigned to the signal having the lowest strength;

(i) receiving the request for a time slot assignment and the portion of first preference list transmitted by the subscriber unit, and measuring signal strength of the subscriber unit;

(j) determining the potential carrier to interference ratio of the time slots in the second preference list with respect to the signals in the second preference list; and (k) choosing a time slot based on the received portion of the first preference list, and on the second preference list, and assigning the chosen time slot to the subscriber unit.

2. The method of claim 1, wherein the predetermined criteria of step (c) include the number of time slots having at least a predetermined carrier to interference ratio.

3. The method of claim 1, wherein the predetermined criteria of step (c) include the number of time slots having at least a predetermined bit rate.

4. The method of claim 1, further comprising the step of: with the selected base station:

(j1) transmitting, to the subscriber unit, an acknowledgement signal.

5. The method of claim 1, further comprising the step of:

(f1) eliminating time slots having less than a predetermined carrier to interference ratio from the first preference list.

6. The method of claim 2, wherein the predetermined carrier to interference ratio is adjusted to maximize traffic capacity.

7. The method of claim 2, wherein the predetermined carrier to interference ratio is adjusted to minimize the number of interrupted calls.

8. The method of claim 2, wherein the predetermined carrier to interference ratio is adjusted to optimize the traffic capacity and the number of interrupted calls.

9. The method of claim 4, further comprising the steps of: with the subscriber unit:

(l) detecting the time slot assignment when the acknowledgement signal is received; and (m) transmitting, on the inbound time slot having the next lowest signal strength, a request for a time slot assignment from the base station selected in step (d) when the acknowledgement signal is not received.

10. The method of claim 5, further comprising the step of: with the subscriber unit and the base station:

(n) commencing communication.

11. In a TDMA communication system having a communication medium with a plurality of time slots, at least one of which includes a control channel, at least one subscriber unit, and a plurality of base stations, a method for time slot handoff comprising the steps of:

(a) transmitting, with each base station, a radio-frequency signal in at least one time slot;

(b) communicating with a selected base station, with a subscriber unit, in one of the time slots;

(c) measuring, with each the subscriber unit and the selected base station, the bit error rates of inbound and outbound time slots to determine the carrier to interference ratios of the inbound and outbound time slots;

(d) determining, with each the subscriber unit and the selected base station, whether a time slot handoff is required based on the carrier to interference ratios determined in step (c);

(e) measuring, with each the subscriber unit and the selected base station, the signal level of inbound and outbound time slots, when handoff is required;

(f) determining, with the subscriber unit, the carrier to interference ratios with respect to the selected base station signal level, and, with the selected base station, the carrier to interference ratio with respect to the subscriber signal level;

(g) producing a first preference list, with the subscriber unit, based on the carrier to interference ratio that it determined in step (f), and producing a second preference list, with the selected base station, based on the carrier to interference ratio that it determined in step (f);

(h) transmitting, with the subscriber unit, in the current time slot, a request for a time slot reassignment, and at least a portion of the first preference list;

(i) receiving, with the selected base station, the request for a time slot reassignment and the portion of the first preference list, and transmitting an acknowledgement signal;

(j) detecting the acknowledgement signal with the subscriber unit; and (k) choosing a time slot, with the selected base station, based on the received portion of the first preference list, and on the second preference list, and transmitting an assignment of the chosen time slot to the subscriber unit.

12. The method of claim 11, further comprising the step of: with the subscriber unit:

(h1) transmitting, on the inbound time slot having the next lowest signal strength, a request for a time slot assignment from the base station selected in step (d) when the acknowledgement signal is not received.

13. The method of claim 11, further comprising the step of: with the selected base station:

(j1) requesting a greater portion of the first preference list if the time slots in the first preference list do not comply with a set of requirements maintained by the selected base station.

14. In a TDMA communication system having a communication medium with a plurality of time slots, at least one of which includes a control channel, at least one subscriber unit, and a plurality of base stations, a method for time slot handoff comprising the steps of:

(a) transmitting, with each base station, a radio-frequency signal in at least one time slot;

(b) communicating with a selected base station, with a subscriber unit, in one of the time slots;

(c) measuring, with each the subscriber unit and the selected base station, the bit error rates of inbound and outbound time slots to determine the carrier to interference ratios of the inbound and outbound time slots;

(d) determining, with each the subscriber unit and the selected base station, whether a time slot handoff is required based on the carrier to interference ratios determined in step (c);

(e) measuring, with each the subscriber unit and the selected base station, the signal level of inbound and outbound time slots, when handoff is required;

(f) determining, with the subscriber unit, the carrier to interference ratios with respect to the selected base station signal level, and, with the selected base station, the carrier to interference ratio with respect to the subscriber signal level;

(g) producing a first preference list, with the subscriber unit, based on the carrier to interference ratio that it determined in step (f), and producing a second preference list, with the selected base station, based on the carrier to interference ratio that it determined in step (f);

(h) transmitting, in the current time slot with the selected base unit, a time slot reassignment request;

(i) receiving, with the subscriber unit, the time slot assignment request, and sending at least a portion of the first preference list;

(j) receiving with the selected base station, the first preference list; and (k) choosing a time slot, with the selected base station, based on the the received portion of the first preference list, and on the second preference list, and transmitting an assignment of the chosen time slot to the subscriber unit.

15. The method of claim 14, further comprising the step of: with the subscriber unit:

(h1) transmitting, on the inbound time slot having the next lowest signal strength, a request for a time slot assignment from the base station selected in step (d) when the acknowledgement signal is not received.

16. The method of claim 14, further comprising the step of: with the selected base station:

(j1) requesting a greater portion of the first preference list if the time slots in the first preference list do not comply with a set of requirements maintained by the selected base station.

17. The method of claim 14, further comprising the step of: with the subscriber unit:

(l) receiving the time slot assignment and commencing communication on the assigned time slot.

18. In a TDMA communication system having a communication medium with a plurality of time slots, at least one of which includes a control channel, and a plurality of base stations, a radio transceiver comprising:

means for receiving RF signals from the plurality of base stations on at least one predetermined time slot;

means for measuring the signal energy in each time slot;

means for calculating the potential carrier to interference ratios of each time slot containing the signals transmitted by the base stations;

means for generating a time slot preference list based on carrier to interference ratios of the time slots containing the signals transmitted by the base stations; and means for selecting a base unit for communication therethrough, based on the preference list.

19. The radio transceiver of claim 18, wherein each radio-frequency signal has an identification code identifying the base unit that transmitted the radio-frequency signal.

20. A base station for use in a TDMA communication system having at least one subscriber unit that maintains a first preference list containing time slots, wherein the time slots having the lower signal strengths are assigned higher preferences, the base station comprising:

means for transmitting a radio-frequency signal in at least one predetermined time slot, the radio-frequency signal including a base identification portion;

means for measuring the signal strengths of the inbound and outbound time slots to produce a second preference list based on signal strength;

means for determining the potential carrier to interference ratio with respect to the signal in the second preference list having the highest signal strength;

means for receiving the request for a time slot assignment from the subscriber unit; and means for transmitting, to the subscriber unit, an acknowledgement signal, the selected time slot assignment, and the second preference list.

* * * * *